A. J. BASTIAN.
PROCESS OF MAKING LAMINATED ARTICLES.
APPLICATION FILED JULY 6, 1915.

1,223,348. Patented Apr. 17, 1917.

WITNESSES:

INVENTOR
Arthur J. Bastian.
BY
ATTORNEY

UNITED STATES PATENT OFFICE.

ARTHUR J. BASTIAN, OF EDGEWOOD PARK, PENNSYLVANIA, ASSIGNOR TO WESTINGHOUSE ELECTRIC AND MANUFACTURING COMPANY, A CORPORATION OF PENNSYLVANIA.

PROCESS OF MAKING LAMINATED ARTICLES.

1,223,348.

Specification of Letters Patent. Patented Apr. 17, 1917.

Application filed July 6, 1915. Serial No. 38,265.

*To all whom it may concern:*

Be it known that I, ARTHUR J. BASTIAN, a citizen of the United States, and a resident of Edgewood Park, in the county of Allegheny and State of Pennsylvania, have invented a new and useful Improvement in Processes of Making Laminated Articles, of which the following is a specification.

My invention relates to the manufacture of laminated articles and it has special reference to processes of making such articles from blanks or fibrous material united by means of an adhesive substance. One specific application of my present process is in the manufacture of gear wheels and pinions composed of sheets of paper or cloth coated or impregnated with a suitable adhesive material and caused to adhere together by means of heat and pressure.

Gear wheels and pinions have heretofore been made from sheet material constructed according to the general method just mentioned by cutting blanks from blocks of such material and machining the gear teeth by methods similar to those employed in cutting metal gears. It is one purpose of my present invention to greatly simplify the manufacture of such gears and, at the same time, to produce gears of great accuracy and uniformity.

I proceed by coating or impregnating sheets of fibrous material, preferably cotton duck, with an adhesive material and then punching blanks from the impregnated sheets that correspond in size and outline to the shape of a completed gear. I then stack a suitable number of the punched blanks, according to the desired thickness of the finished gear and press the assembled stack in a hot mold that is shaped to conform exactly to the outline of the desired gear. The heat and pressure are continued in the mold long enough to fuse the adhesive material and to firmly unite all of the blanks together, after which the mold is allowed to cool and the finished gear is removed.

If the mold is prepared with sufficient accuracy, the finished gear will be much more accurately formed than is possible by ordinary cutting methods, and it is obvious that all of the gears so made will be identical in shape. If desired, and, particularly, when the highest degree of accuracy is not required, the mold may be dispensed with and the stacked blanks compacted by pressing them between heated plates.

Figure 1:
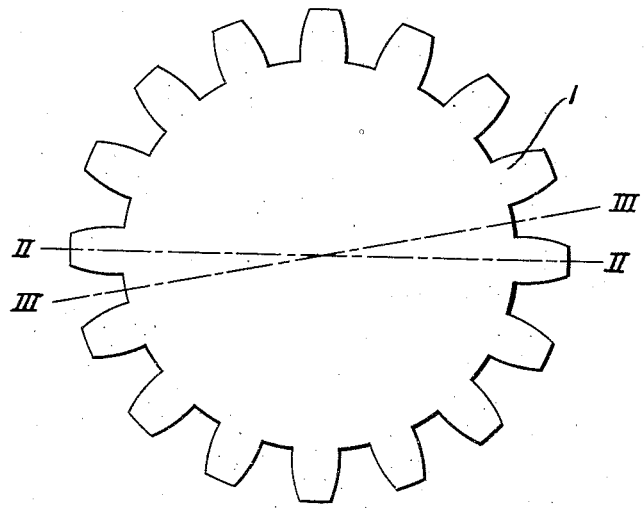
Figure 2:
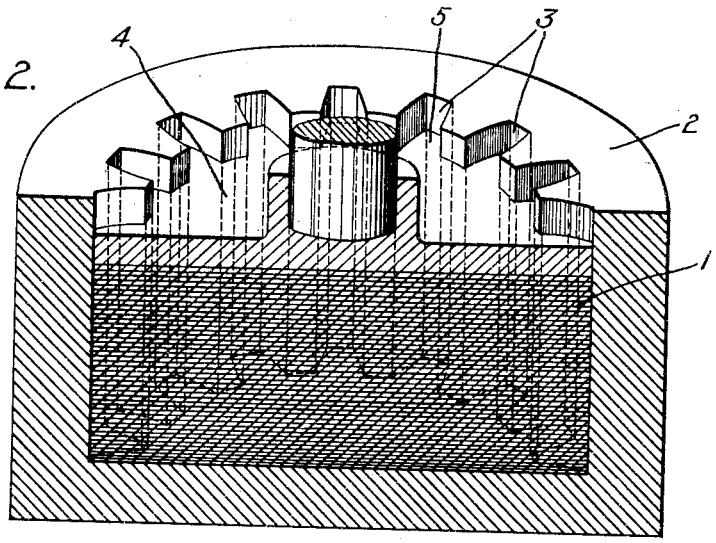
Figure 3:
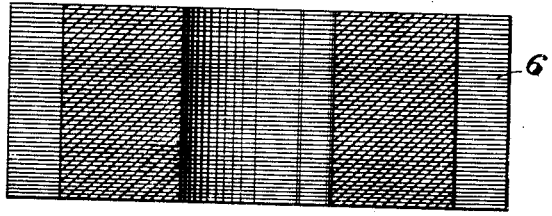

The manufacture of a gear wheel in accordance with my process is illustrated in the accompanying drawing, in which Figure 1 is a plan view of a punched lamination of fibrous material coated or impregnated with a binder. Fig. 2 is a view, partially in perspective and partially in vertical section, of a mold containing a stack of laminations such as that shown in Fig. 1, the section through each lamination being taken substantially along the line II—II, Fig. 1, and Fig. 3 is a transverse central sectional view showing a finished gear made in accordance with the present process, the section through the laminations being taken substantially along the line III—III, Fig. 1.

In practising my process according to the manner illustrated in the drawing, a number of blanks are punched from sheets of cotton duck which are coated or impregnated with a phenolic condensation product or some other suitable adhesive substance. A sufficient number of the punched laminations 1 to compose the finished gear when pressed together are placed in a mold consisting of a die member 2 provided with longitudinally extending recesses 3 corresponding in number and shape to the teeth of the finished gear wheel, and a plunger member 4, provided with projections 5 which fit closely within the depressions 3 of the die member, is then forced downwardly upon the stack of laminations 1. Heat is applied to the mold in any suitable manner for the purpose of causing the adhesive material to be softened and distributed evenly through the stack of blanks and also in order to harden the binder if the binder employed is of such a nature as to harden under the influence of heat. The heat and pressure are continued until the laminations are compacted into a firm and integral structure when the plunger member 4 and the finished gear 6 are withdrawn from the mold.

I at present prefer to employ, as the adhesive material in practising my process, one of the phenolic condensation products which are initially produced in liquid form and are transformed by heat and pressure into hard, infusible and relatively insoluble masses. Other adhesive materials may, however, be employed, examples of which are cumaron, indene, para-cumaron, para-indene and mixtures of these bodies. It is also possible to produce firm and hard molded products with the use of Chinese wood oil (tung oil) as the adhesive, the oil being polymerized during the hot molding operation.

It is to be understood that my process is not restricted to the production of gears and pinions, although these articles of manufacture are specifically mentioned above. My process is equally applicable to the formation of articles having no teeth, and such articles may be of any shape desired provided they may be formed by superposing blanks of proper outlines and compacting the stack of blanks. The blanks, of whatever shape, should correspond, in size and shape, to a section of the finished article having the same thickness, and it is found that the slight lateral expansion produced by the compression of the blanks results in the production of accurately molded articles without any excess of material. It is characteristic of toothed gears and other objects produced in accordance with my present invention that the surfaces of the object formed by the edges of the component laminations are covered with a continuous coating of the adhesive material which is employed and are thus effectively sealed against the entrance of moisture, oil or other fluids. This feature distinguishes toothed gears made in accordance with my invention from gears which are cut from laminated blocks composed of fabric and a binder, since, in the latter case, the edges of the laminations are exposed in the tooth-cutting operation and will therefore absorb considerable amounts of water or oil when the gears are exposed to such liquids.

While I prefer to impregnate the sheets of fabric before punching, it is obviously possible to punch the blanks from untreated fabric and to coat and heat them subsequently. Many other variations may be made in the steps of the process which I have described without departing from the scope of my invention, and it is therefore to be understood that no limitations are to be imposed upon my invention unless indicated in the appended claims.

I claim as my invention:

1. The process of making a shaped composite article that comprises forming blanks of sheet material corresponding in outline to the shape of the finished article, superposing a plurality of the said blanks associated with an adhesive material, and compacting the assembled materials in a mold conforming in shape to the finished article.

2. The process of making a shaped composite article that comprises forming blanks corresponding in outline to the shape of the finished article from fibrous sheet material associated with an adhesive material, superposing a plurality of the said blanks, and compacting the assembled materials in a mold conforming in shape to the finished article.

3. The process of making a composite article that comprises forming blanks of fibrous sheet material corresponding in outline to the shape of the finished article, superposing a plurality of the said blanks associated with an adhesive material, and applying heat and pressure to the assembled materials while confined in a mold conforming in shape to the finished article.

4. The process of making a composite article that comprises forming blanks of fibrous sheet material corresponding in outline to the shape of the finished article, superposing a plurality of the said blanks associated with a phenolic condensation product, and compacting the assembled materials in a mold conforming in shape to the finished article.

5. The process of making a composite article that comprises forming blanks corresponding in outline to the shape of the finished article from fibrous sheet material associated with a phenolic condensation product, superposing a plurality of the said blanks and applying heat and pressure to the superposed blanks while confined in a mold conforming in shape to the finished article.

6. The process of making a toothed gear that comprises forming blanks of sheet material corresponding in outline to the shape of the finished gear, superposing a plurality of the said blanks associated with an adhesive material, and compacting the assembled materials in a mold conforming in shape to the finished article.

7. The process of making a toothed gear that comprises forming blanks of fibrous sheet material corresponding in outline to the shape of the finished gear, superposing a plurality of the said blanks associated with an adhesive material, and applying heat and pressure to the assembled materials while confined in a mold conforming in shape to the finished gear.

8. The process of making a gear that comprises forming blanks corresponding in outline to the shape of the finished gear from fibrous sheet material associated with a phenolic condensation product, superposing a plurality of the said blanks and applying heat and pressure to the superposed blanks while confined in a mold conforming in shape to the finished gear.

In testimony whereof, I have hereunto subscribed my name this 29th day of June, 1915.

ARTHUR J. BASTIAN.